United States Patent
Fukuda et al.

(10) Patent No.: US 9,460,569 B2
(45) Date of Patent: Oct. 4, 2016

(54) VEHICULAR ELECTRONIC CONTROL APPARATUS

(71) Applicant: DENSO CORPORATION, Kariya, Aichi-pref. (JP)

(72) Inventors: Kazutaka Fukuda, Nagoya (JP); Kenji Fukuta, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/669,053

(22) Filed: Mar. 26, 2015

(65) Prior Publication Data

US 2015/0294512 A1 Oct. 15, 2015

(30) Foreign Application Priority Data

Apr. 14, 2014 (JP) .................................. 2014-82743

(51) Int. Cl.
G07C 5/00 (2006.01)
G01M 17/00 (2006.01)
G07C 5/08 (2006.01)
G06F 12/02 (2006.01)

(52) U.S. Cl.
CPC ......... *G07C 5/0841* (2013.01); *G06F 12/0246* (2013.01); *G06F 2212/7202* (2013.01)

(58) Field of Classification Search
CPC combination set(s) only.
See application file for complete search history.

(56) References Cited

U.S. PATENT DOCUMENTS

| | | | |
|---|---|---|---|
| 2009/0037044 A1* | 2/2009 | Enomoto ............... | G07C 5/008 701/29.6 |
| 2009/0037046 A1* | 2/2009 | Teramura .............. | B60W 50/04 701/33.4 |
| 2009/0271064 A1* | 10/2009 | Enomoto .............. | B60W 50/02 701/31.4 |
| 2009/0281689 A1* | 11/2009 | Suganuma ............ | G06F 11/006 701/33.4 |
| 2010/0292892 A1* | 11/2010 | Enomoto ............... | G07C 5/008 701/33.4 |

FOREIGN PATENT DOCUMENTS

JP 1999-280536 A 10/1999
JP 2011-025781 A 2/2011

* cited by examiner

*Primary Examiner* — Yonel Beaulieu
(74) *Attorney, Agent, or Firm* — Posz Law Group, PLC

(57) ABSTRACT

A vehicular electronic control apparatus includes a non-volatile memory, a storing portion, and a determination unit. The non-volatile memory is capable of storing a permanent diagnostic trouble code of a vehicle. The storing portion stores a real-time destination value indicating a currently set destination of the vehicle. The determination unit determines, based on the real-time destination value stored in the storing portion, whether the permanent diagnostic trouble code is a target permanent diagnostic trouble code to be stored in the non-volatile memory.

4 Claims, 4 Drawing Sheets

| DEST | VALUE |
|---|---|
| DEFAULT | 0xFF |
| NORTH AMERICA | 0x01 |
| JAPAN | 0x02 |
| .... | .... |

VEHICULAR ELECTRONIC CONTROL APPARATUS

CROSS REFERENCE TO RELATED APPLICATION

This application is based on Japanese Patent Application No. 2014-082743 filed on Apr. 14, 2014, the disclosure of which is incorporated herein by reference.

TECHNICAL FIELD

The present disclosure relates to a vehicular electronic control apparatus that includes a non-volatile memory and reads out diagnostic trouble code using an external tool.

BACKGROUND

Generally, a vehicular electronic control apparatus (ECU) includes a non-volatile memory. The vehicular electronic control apparatus manages market specifications, for example, market specifications for North America by storing information corresponding to the destination in the non-volatile memory during a manufacturing of the vehicle. Herein, destination indicates a transportation destination or an exportation destination for selling out the vehicle in a market. Specifically, the information corresponding to the destination is usually stored in the non-volatile memory in an inspection step during the manufacturing of the vehicle. The inspection is carried out before shipping the vehicle out from a manufacturing plant. The information corresponding to the destination is written in the non-volatile memory by an external tool, which is connectable with the electronic control apparatus.

As another example, an electronic control apparatus may determine an abnormality occurrence based on information acquired from various on-board sensors. When an abnormality occurs to the vehicle, the electronic control apparatus stores abnormality information related to the abnormality in the memory. That is, when an abnormality occurs to an on-board sensor, diagnostic trouble code (DTC) related to the abnormality is stored in the non-volatile memory. A service man in a dealer facility or in a manufacturing plant can read out the DTC from the electronic control apparatus using an external tool, and repairs the vehicle or replaces a vehicle component based on the DTC that is read out from the vehicle as disclosed in JP 2009-059334 A (corresponding to US 2009/0037044 A1).

For example, when a mistake is made in an inspection step during a vehicle manufacturing process, the electronic control apparatus may mistakenly store DTC related to the mistake as a permanent diagnostic trouble code (PDTC) in a specified region of the memory in a non-volatile manner. That is, the PDTC may be mistakenly stored in the non-volatile memory before the shipment of the vehicle from the manufacturing plant.

Suppose that the vehicle is shipped out from the manufacturing plant with the PDTC stored in the non-volatile memory. The PDTC may indicate a mistake made by a worker in the manufacturing plant during the inspection step of the vehicle. After the vehicle is shipped out, when the destination of the vehicle is changed, DTC indicating the destination change is stored in the non-volatile memory as PDTC. After storing the information related to the destination change as the PDTC, the PDTC related to the mistake made by the manufacturing plant worker during the inspection step cannot be deleted from the memory because the PDTC related to the mistake is stored before the PDTC related to the destination change. That is, a deletion of mistakenly stored PDTC from the non-volatile memory becomes difficult. Thus, when the service man in the dealer facility or in the manufacturing plant reads out the PDTC using the external tool, the mistakenly stored PDTC is also read out from the non-volatile memory. As a result, even when there is no abnormality occurrence after the vehicle is shipped out from the manufacturing plant, the external tool may determine an abnormality occurrence based on the readout PDTC. Further, similar situation may happen when changing the ECU in the dealer facility after selling the vehicle to a client.

SUMMARY

In view of the foregoing difficulties, it is an object of the present disclosure to provide a vehicular electronic control apparatus that suppresses an erroneous determination of an abnormality when an external tool reads out permanent diagnostic trouble codes from the vehicular electronic control apparatus.

According to a first aspect of the present disclosure, a vehicular electronic control apparatus includes a non-volatile memory, a storing portion, and a determination unit. The non-volatile memory is capable of storing a permanent diagnostic trouble code of a vehicle. The storing portion stores a real-time destination value indicating a currently set destination of the vehicle. The determination unit determines, based on the real-time destination value stored in the storing portion, whether the permanent diagnostic trouble code is a target permanent diagnostic trouble code to be stored in the non-volatile memory.

With the above vehicular electronic control apparatus, an erroneous determination of an abnormality is suppressed when an external tool reads out permanent diagnostic trouble codes from the vehicular electronic control apparatus.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
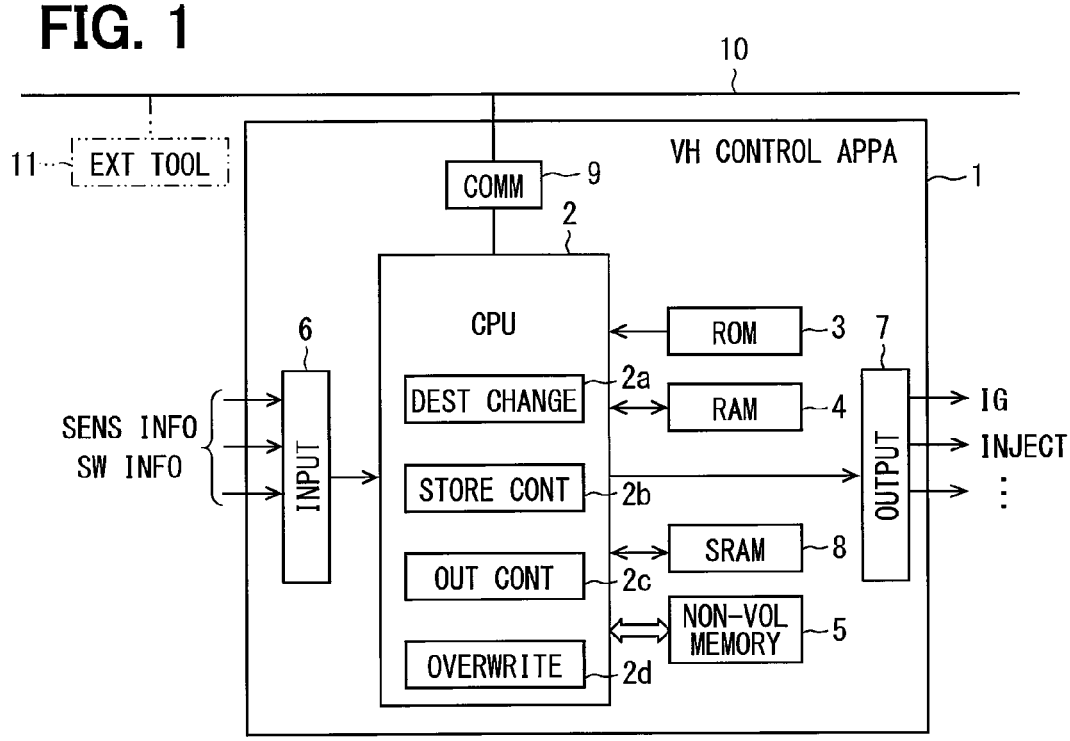
FIG. 1 is a block diagram showing an electric configuration of a vehicular electronic control apparatus according to an embodiment of the present disclosure.

The following will describe a vehicular electronic control apparatus according to an embodiment of the present disclosure with reference to the drawings. FIG. 1 is a block diagram showing an electric configuration of a vehicular electronic control apparatus (VH CONTROL APPA) 1. Hereinafter, the vehicular electronic control apparatus 1 is also referred to as ECU 1.

The ECU 1 is equipped to a vehicle, and controls an operation of the vehicle. For example, the ECU 1 may control an operation of an engine of the vehicle. In the following description, an engine control ECU may be described as one example of the ECU 1. As another example, the present disclosure may be applied to different ECUs having different functions.

Figures 3, 4:
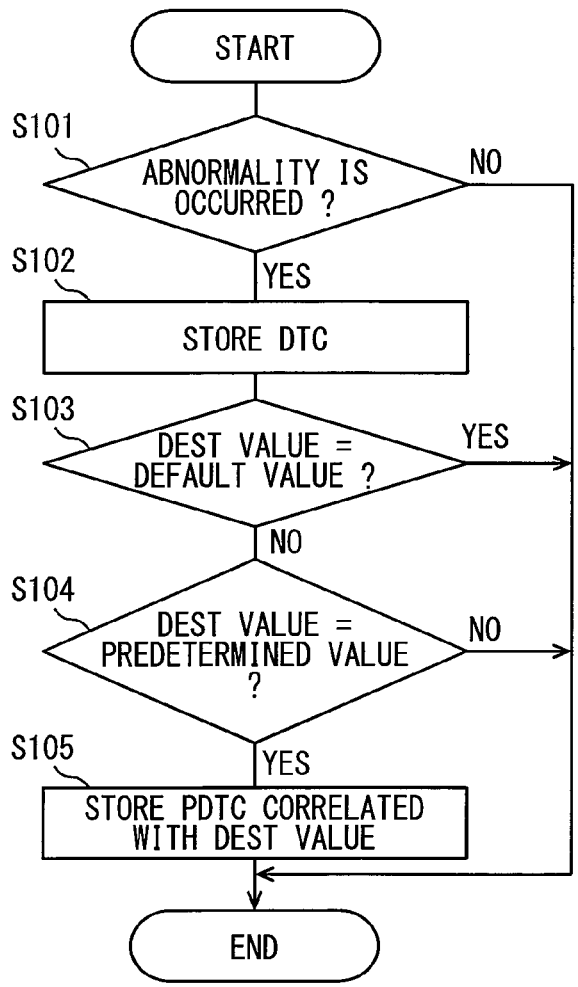
FIG. 3 is a flowchart showing an exemplary storing process executed by a determination unit of the vehicular electronic control apparatus.
FIG. 4 is a diagram showing an example of a destination setting table.

The ECU 1 includes a central processing unit (CPU) 2, a read-only memory (ROM) 3 that stores programs to be executed by the CPU 2, a random access memory (RAM) 4 that temporarily stores various data, a rewritable non-volatile memory (NON-VOL MEMORY) 5, an input circuit (INPUT) 6, and an output circuit (OUTPUT) 7. The non-volatile memory 5 may be provided by an electrically erasable programmable read-only memory. The CPU 2 of the ECU 1 executes the programs stored in the ROM 3 in order to function as a determination unit 2, a destination changing section (DEST CHANGE) 2a, a storing control section (STORE CONT) 2b, an output control section (OUT CONT) 2c, and an overwriting section (OVERWRITE) 2d. The ROM 3 preliminarily stores a destination setting table 100 as shown in FIG. 4. The ECU 1 further includes a static random access memory (SRAM) 8. The SRAM 8 is continuously supplied with power by a battery for maintaining the data stored in the SRAM 8.

The CPU 2 receives various kinds of information detected by various sensors through the input circuit 6, and controls the operation of the engine based on the received information. The various sensors may include an intake pipe pressure sensor, an engine rotational speed sensor, an oxygen sensor in an exhaust system, and a vehicle speed sensor (none of these sensors are shown in the drawing). An air fuel ratio sensor may also be used instead of the oxygen sensor in the exhaust system. The CPU 2 also receives switch information indicating turning on or turning off of various switches, such as an ignition switch. The CPU 2 outputs a control signal to an electric load through the output circuit 7. The electric load may include an ignition device (IG), an injector (INJECT), or a warning lamp.

The CPU2 performs arithmetic operations based on various kinds of information that are inputted to the CPU 2 through the input circuit 6, and outputs an instruction signal to the output circuit 7 based on the arithmetic operation result. With this configuration, the CPU 2 performs a control process. For example, the CPU 2 calculates turn-on time or turn-off time of an injection valve of the injector, and controls fuel injection to the engine based on the turn-on time or turn-off time of the injection valve.

The ECU 1 further includes a communication device (COMM) 9. The communication device 9 performs a communication with a different ECU (not shown) that is connected to an in-vehicle bus 10, or performs a communication with an external tool (EXT TOOL) 11. The external tool 11 is connectable to the in-vehicle bus 10 via a connector or a cable (either is not shown). The external tool 11 may be provided by a mobile terminal including a microcomputer and a display panel. As another example, the external 11 may also be provided by a general purpose computer.

Figure 2:
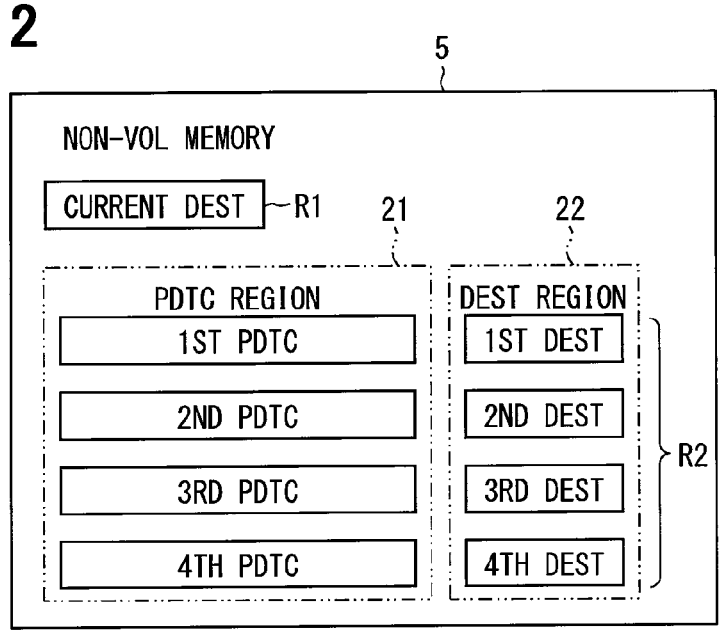
FIG. 2 is a diagram showing information stored in a non-volatile memory.

FIG. 2 is a diagram showing contents stored in respective memory regions of the non-volatile memory 5 of the ECU 1. The non-volatile memory 5 includes a first memory region R1 and a second memory region R2. The first memory region R1 stores a destination value (CURRENT DEST) indicating a currently set destination of the vehicle, and the second memory region R2 stores a PDTC corresponding to the current destination value indicating the currently set destination. That is, the current destination value indicating currently set destination is paired with the corresponding PDTC in the second memory region R2 of the non-volatile memory 5. The first memory region R1 is also referred to as a first storing portion and the second memory region R2 is also referred to as a second storing portion. The first and second memory regions R1, R2 are provided by rewritable memory regions. The first memory region R1 has one-byte size, and stores a value "0xFF" as a default value. Herein, default value indicates a manufacturing plant of the vehicle. The CPU 2 compares the destination value stored in the first memory region R1 with the destination value stored in the destination setting table 100 shown in FIG. 4, and sets the destination based on the comparison result. Herein, the destination setting table 100 is preliminarily stored in the ROM 3.

The second memory region R2 stores the PDTC correlated with the current destination, which is stored in the first memory region R1. The second memory region R2 includes a PDTC storing region (PDTC REGION) 21 for storing the PDTC and includes a destination value storing region (DEST REGION) 22 for storing the destination value. The PDTC storing region has two-byte size, and the destination value storing region has one-byte size.

The vehicular electronic control apparatus 1 is required for including at least four PDTC storing regions for complying with On-Board Diagnostic regulations. Thus, as shown in FIG. 2, in the present embodiment, the second memory region R2 has four PDTC storing regions 21 and four destination value storing regions 22 corresponding to respective PDTC storing regions 21. In the present embodiment, the non-volatile memory 5 includes only four PDTC storing regions 21 and respective four destination value storing regions 22. As another example, the non-volatile memory 5 may include five or more pairs of PDTC storing region 21 and destination value storing region 22.

The destination changing section 2a of the CPU 2 is a functional portion for changing the destination value stored in the first memory region R1. The storing control section 2b of the CPU 2 is a functional portion that determines whether one PDTC is a target PDTC or not before storing the PDTC in the non-volatile memory 5 as the target PDTC. When the storing control section 2b determines that the PDTC is not the target PDTC, the storing control section 2b forbids a storing of the PDTC in the non-volatile memory 5 as the target PDTC. The output control section 2c of the CPU 2 is a functional portion that determines whether to output the PDTC stored in the non-volatile memory 5 to an external device. When the PDTC is mistakenly stored in the non-volatile memory 5, the output control section 2c forbids an output of the mistakenly stored PDTC from the non-volatile memory 5 to the external tool 11. The output control section 2c allows an output of the PDTC when the PDTC is correlated with a destination value identical to the destination value stored in the first memory region R1. Hereinafter, the destination value stored in the first memory region R1 is referred to as a real-time destination value, and the destination value stored in the second memory region R2 is referred to as a history destination value.

The following will describe an operation of the vehicular electronic control apparatus 1 in detail. FIG. 3 is a flowchart showing a storing process executed by the CPU 2 of the ECU 1 for storing the PDTC. The following will describe an operation of the ECU 1 during the manufacturing process or inspection step of the vehicle in the manufacturing plant, and an operation of the ECU 1 after selling out of the vehicle.

During the inspection step of the vehicle in the manufacturing plant, the CPU 2 of the ECU 1 determines whether an abnormality has occurred to the vehicle by confirming the multiple kinds of information including sensor information (SENS INFO) transmitted from various sensors and switch information (SW INFO) transmitted from various switches (S101). At this time, the CPU 2 determines whether the sensor information and the switch information are abnormal by comparing the sensor information or the switch information with predetermined reference values. Herein, the predetermined reference values are preliminarily set for detecting the abnormalities occurred to the vehicle.

For example, the CPU 2 may determine whether a range of an output signal from the sensor is included within a predetermined range for detecting an abnormality occurrence. Specifically, the CPU 2 may determine an occurrence of an abnormality in the sensor when the range of the output signal is out of the predetermined range.

As described above, at S101, the CPU 2 determines whether an abnormality occurs to the vehicle. When the CPU 2 determines no abnormality occurs to the vehicle (S101: NO), the CPU 2 ends the process shown in FIG. 3. When the CPU 2 determines an occurrence of the abnormality in the vehicle, the CPU 2 stores the DTC corresponding to the abnormality in the SRAM 8 at S102. At this time, the DTC stored in the SRAM 8 is different from the PDTC permanently stored in the non-volatile memory 5.

At S103, the CPU 2 determines whether the destination value stored in the first memory region R1 is the default value. As shown in FIG. 4, the default value is an initial value stored in the non-volatile memory 5. For example, the default value is set as "0xFF". Herein, "0x" indicates the value is hexadecimal value. During a series of vehicle management states including manufacturing, inspection, transportation, and exportation, a data indicating the manufacturing of the vehicle and a data indicating the inspection of the vehicle are assigned to the default value "0xFF". Thus, the default value indicates a manufacturing plant of the vehicle where the manufacturing or the inspection is carried out.

In one example, suppose that the ECU 1 is equipped to the vehicle body in the manufacturing plant. In this case, when the operation of the ECU 1 is inspected in the inspection step, the CPU 2 determines that the destination value stored in the first memory region R1 is the default value at S103 (S103: YES), and ends the process shown in FIG. 3 without storing the PDTC at S105. The storing of PDTC at S105 will be described later in detail. With this configuration, even when a worker in the manufacturing plant makes a mistake in assembly order or in inspection order, the erroneous storing of the PDTC in the non-volatile memory 5 can be avoided.

When the CPU 2 determines that the destination value stored in the first memory region R1 is not equal to the default value (S103: NO) and further is not equal to any one of predetermined destination values (S104: NO), the CPU 2 ends the process shown in FIG. 3 without storing the PDTC at S105. Herein, the predetermined destination values are values preliminarily set in the manufacturing plant corresponding to respective destinations. Herein, the destination is a transportation destination or an exportation destination of the vehicle for selling out the vehicle in a market.

For example, as shown in FIG. 4, the predetermined destination values are set corresponding to respective destinations in the destination setting table 100. In FIG. 4, the predetermined destination value for North America is set to "0x01", and the predetermined destination value for Japan is set to "0x02".

At S104, the CPU 2 determines whether the real-time destination value stored in the first memory region R1 is equal to any one of the predetermined destination values defined in the destination setting table 100. When the real-time destination value stored in the first memory region R1 is not equal to any one of the predetermined destination values defined in the destination setting table 100 (S104: NO), the CPU 2 ends the process shown in FIG. 3. For example, in the inspection step during the manufacturing of the vehicle, when the CPU 2 determines that real-time destination value stored in the first memory region R1 is not equal to the predetermined destination value of a transportation destination candidate or an exportation destination candidate of the vehicle (for example, "0x01", "0x02"), the CPU 2 ends the process shown in FIG. 3.

Usually, the destination value is set to the default value in the first memory region R1 before the inspection step of the vehicle. Thus, when the CPU 2 determines that the destination value stored in the first memory region R1 is equal to the default value (S103: YES), the PDTC acquired at this timing is not stored in the non-volatile memory 5. Further, suppose that the destination value stored in the first memory region R1 is not equal to the default value and is not equal to any one of the predetermined destination values (S104: NO). In this case, even though the DTC corresponding to the real-time destination value has been stored in the SRAM 8 at S102, the DTC is not stored as PDTC in the non-volatile memory 5.

The CPU 2 of the ECU 1 performs above-described processes during the inspection step or manufacturing process of the vehicle. Thus, even when the worker who inspects the vehicle in the manufacturing plant has made a mistake in the inspection order or in the assembly order, the DTC related to the mistake is avoided to be stored in the non-volatile memory 5 as PDTC.

After the vehicle is shipped out from the manufacturing plant or from the inspection plant, suppose that an abnormality is occurred in the vehicle after the predetermined destination of the vehicle is set. In this case, the CPU 2 stores the DTC related to the abnormality in the SRAM 8 at S102 and stores the destination value indicating the predetermined destination of the vehicle in the first memory region R1 as the real-time destination value. Further, when the CPU 2 determines that the real-time destination value is not equal to the default value (S103: NO) but is equal to one of the predetermined destination values (S104: YES), the CPU 2 stores the DTC in the SRAM 8 as PDTC in the second memory region R2 and further stores the real-time destination value correlated with the PDTC in the second memory region R2 at S105. The CPU 2 performs above-described process after shipment of the vehicle from the manufacturing plant. Thus, when an abnormality is occurred in the vehicle at a corresponding destination, that is, when an abnormality is occurred in the vehicle after the setting of the destination value corresponding to the predetermined destination, the DTC corresponding to the destination can be stored in the non-volatile memory 5 as PDTC. With this configuration, the non-volatile memory 5 stores only useful PDTC as the target PDTC.

Figure 5:
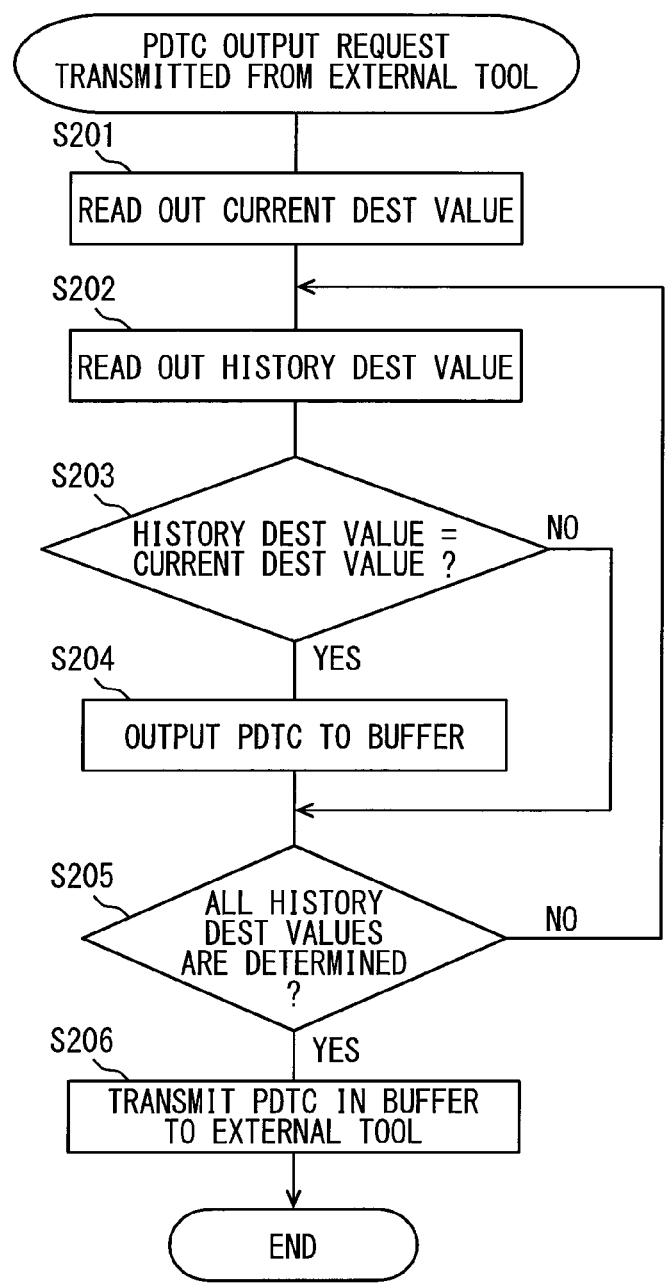
FIG. 5 is a flowchart showing an exemplary output process executed by an output control section of the vehicular electronic control apparatus.

In the present embodiment, in order to improve a reliability of the vehicular electronic control apparatus 1, the vehicular electronic control apparatus 1 forbids an output of the PDTC to the external tool 11 when the DTC is mistakenly stored as PDTC in the non-volatile memory 5 by some reasons. The following will describe a control process executed by the CPU 2 of the ECU 1 for forbidding an output of the PDTC from the non-volatile memory 5 to the external tool 11 with reference to FIG. 5.

For example, when the vehicle inspection is performed in the dealer facility, the external tool 11 is connected to the bus 10 of the vehicle in order to read out the PDTC from the non-volatile memory of the ECU 1. For example, as shown in FIG. 2, suppose that the non-volatile memory 5 of the ECU 1 stores first PDTC (1ST PDTC), first destination value (1ST DEST), second PDTC (2ND PDTC), second destination value (2ND DEST), third PDTC (3RD PDTC), third destination value (3RD DEST), fourth PDTC (4TH PDTC), and fourth destination value (4TH DEST). As described above, the first PDTC is correlated with the first destination value, the second PDTC is correlated with the second destination value, the third PDTC is correlated with the third destination value, and the fourth PDTC is correlated with the fourth destination value.

When a service man in the dealer facility connects the external tool 11 to the bus 10 of the vehicle and operates the external tool 11 for reading out the PDTC, the external tool 11 transmits a PDTC output request to the CPU 2 of the ECU 1. When the CPU 2 receives the PDTC output request from the external tool 11, the CPU 2 executes an output process shown in FIG. 5.

At S201, the CPU 2 reads out the real-time destination value from the first memory region R1 of the non-volatile memory 5 in response to the PDTC output request.

At S202, the CPU 2 reads out the history destination values one by one from the second memory region R2 of the non-volatile memory 5.

At S203, the CPU 2 determines whether the history destination value read out from the second memory region R2 at S202 is equal to the real-time destination value read out from the first memory region R1 at S201. When the CPU 2 determines that the history destination value read out from the second memory region R2 at S202 is equal to the real-time destination value read out from the first memory region R1 at S201 (S203: YES), the CPU 2 outputs the PDTC, which corresponds to the history destination value and is stored in the second memory region R2, to a buffer at S204. Herein, the buffer temporarily stores a response data to the PDTC output request, which is to be output to the external tool 11. When the history destination value read out from the second memory region R2 at S202 is equal to the real-time destination value read out from the first memory region R1, the CPU 2 can determine that the PDTC corresponding to the history destination value read out from the second memory region R2 is a useful PDTC and is a target PDTC to be output to the external tool 11. When the history destination value read out from the second memory region R2 at S202 is not equal to the real-time destination value read out from the first memory region R1, the CPU 2 can determine that the PDTC corresponding to the history destination value read out from the second memory region R2 is a useless PDTC and is not a target PDTC to be output to the external tool 11. The buffer (not shown) is provided by a memory region included in the communication device 9 of the ECU 1 or a memory region included in the RAM 4 of the ECU 1. When the CPU 2 determines that the history destination value read out from the second memory region R2 at S202 is not equal to the real-time destination value read out from the first memory region R1 at S201 (S203: NO), the CPU 2 proceeds to S205.

The CPU 2 repeatedly executes the processes from S202 to S204 until determination to all of the records of PDTC read out from the non-volatile memory 5 is ended (S205: YES). At S206, the CPU 2 outputs the PDTC stored in the buffer to the external tool 11, and ends the process shown in FIG. 5. With this configuration, the ECU 1 is able to output only the PDTC, which corresponds to the real-time destination value, to the external tool 11.

For example, in FIG. 2, among the first to fourth destination values stored in the second memory region R2, suppose that only the second destination value is equal to the real-time destination value stored in the first memory region R1. In this case, the CPU 2 outputs only the second PDTC to the buffer for transmitting only the second PDTC to the external tool 11 as the target PDTC. With this configuration, only the PDTC that correlated with the real-time destination value is transmitted to the external tool 11 as the target PDTC, and remaining non-target PDTCs, such as the first PDTC, the third PDTC, or the fourth PDTC are not output to the external tool 11. With this configuration, an output of useless non-target PDTC to the external tool 11 can be avoided.

As described above, the vehicular electronic control apparatus 1 is required for including at least four PDTC storing regions 21 for complying with On-Board Diagnostic regulations. In the present embodiment, in order to reduce a memory capacity of the non-volatile memory 5, only four pairs of PDTC storing regions 21 and destination value storing regions 22 are included in the non-volatile memory 5. Thus, when a new PDTC needs to be stored in the PDTC storing region 21, the new PDTC is overwritten on the non-target PDTC in the corresponding PDTC storing region 21.

Specifically, at S105 shown in FIG. 3, the CPU 2 may overwrite the non-target PDTC with the new PDTC in the second memory region R2 of the non-volatile memory 5. The following will describe an overwriting process in detail with reference to FIG. 6.

Figure 6:
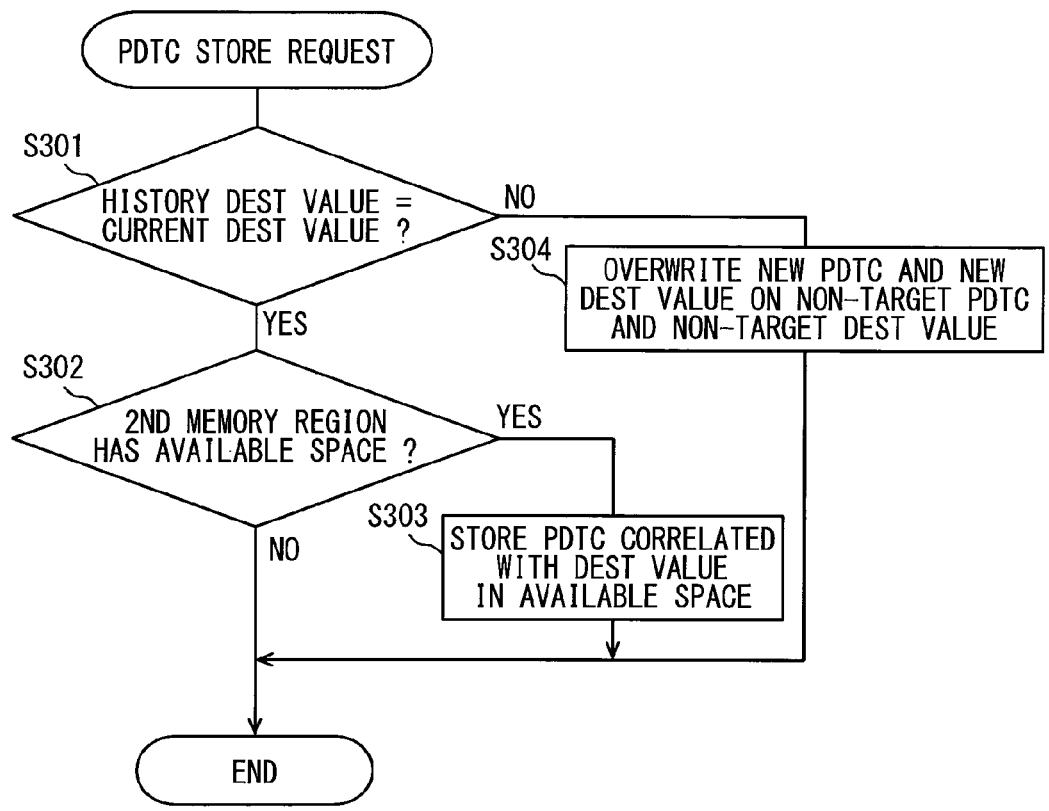
FIG. 6 is a flowchart showing an exemplary overwriting process executed by an overwriting section of the vehicular electronic control apparatus.

FIG. 6 is a flowchart showing the overwriting process executed by the CPU 2 of the ECU 1. At S105 shown in FIG. 3, the CPU 2 stores the target PDTC correlated with the destination value in the non-volatile memory 5. At this time, the CPU 2 determines whether the history destination value, which is already stored in the destination value storing region 22 of the second memory region R2 of the non-volatile memory 5, is equal to the real-time destination value stored in the first memory region R1. Usually, the PDTC correlated with the history destination value, which is different from the real-time destination value, is considered to be useless in an abnormality determination. Thus, at S301, the CPU 2 specifies which PDTC storing region 21 stores useless history PDTC.

When all of the history destination values stored in the second memory region R2 are equal to the real-time destination value (S301: YES), the CPU 2 proceeds to S302. At S302, the CPU 2 determines whether the second memory region R2 has available memory for storing the new PDTC. When the CPU 2 determines that the second memory region R2 has no available memory (S302: NO), the CPU 2 ends the process shown in FIG. 6 without storing the new PDTC in the second memory region R2. When the CPU 2 determines that the second memory region R2 has available memory (S302: YES), the CPU 2 stores the new PDTC correlated with the real-time destination value in the available memory of the second memory region R2 at S303.

When the CPU 2 determines that at least one history destination value stored in the second memory region R2 is not equal to the real-time destination value (S301: NO), the CPU 2 overwrites the new PDTC and corresponding destination value thereof in corresponding PDTC storing region 21 and corresponding destination value storing region 22. Herein, the corresponding PDTC storing region 21 has stored the history PDTC corresponding to the at least one history destination value that is different from the real-time destination value, and the corresponding destination value storing region 22 has stored the at least one history destination value that is different from the real-time destination value. For example, in FIG. 3, suppose that the third destination value corresponding to the third PDTC is different from the real-time destination value stored in the first memory region R1. In this case, the CPU 2 overwrites, respectively, the new PDTC and the corresponding destination value thereof in the PDTC storing region 21 that stores the third PDTC and in the destination value storing region 22 that stores the third destination value. With this configuration, even when the second memory region R2 of the non-volatile memory 5 has limited memory capacity, a shortage of the memory capacity can be solved by overwriting the useless history PDTC with the new PDTC, and the memory capacity of the second memory region R2 can be used in an effective manner.

As described above, the CPU 2 determines whether the PDTC stored in the second memory region R2 is a target PDTC for outputting or not by comparing the corresponding history destination value stored in the second memory region R2 with the real-time destination value stored in the first memory region R1.

In the present embodiment, when the external tool 11 requests a readout of the PDTC, the CPU 2 determines whether the PDTC stored in the second memory region R2 is a target PDTC or a non-target PDTC based on the real-time destination value stored in the first memory region R1. In the present embodiment, the CPU 2 forbids a storing of the non-target PDTC (in FIG. 3, S103: NO and S104: NO) and further forbids an output of the non-target PDTC (in FIG. 5, S203: NO) in order to properly provide only target PDTC to the external tool 11. Thus, an erroneous determination of an abnormality can be suppressed in the external tool 11.

In the present embodiment, the CPU 2 forbids the storing of the PDTC in the second memory region R2 of the non-volatile memory 5 when the real-time destination value stored in the first memory region R1 is equal to the default value. Herein, the default value is set to "0xFF" as an example. Thus, non-target PDTC can be prevented from being stored in the non-volatile memory 5.

In the present embodiment, the CPU 2 forbids the output of the PDTC stored in the second memory region R2 to the external tool 11 when the history destination value correlated with the PDTC stored in the second memory region R2 is not equal to the real-time destination value stored in the first memory region R1. Thus, non-target PDTC can be prevented from being output to the external tool 11.

When a new PDTC needs to be stored in the second memory region R2 of the non-volatile memory 5, the CPU 2 overwrites the new PDTC and the destination value thereof on the non-target PDTC and destination value thereof under a condition that the history destination value stored in the second memory region R2 is different from the real-time destination value stored in the first memory region R1. Thus, even when the vehicular electronic control apparatus 1 is required for including at least four PDTC storing regions for complying with On-Board Diagnostic regulations, the second memory region R2 of the non-volatile memory 5 can be effectively used by overwriting the new PDTC and the destination value thereof on the non-target PDTC and the destination value thereof. That is, by the overwriting, the non-target PDTC and the destination value thereof are deleted from the respective storing regions of the non-volatile memory 5 and the new PDTC and the destination value thereof are stored in the same storing regions of the non-volatile memory 5 instead.

In the present embodiment, the process executed at S103 and S104 in the storing process functions as the storing control section 2b, and the process executed at S203 functions as the output control section 2c.

Other Embodiments

In the foregoing embodiment, the first memory region R1 is provided by a part of the non-volatile memory 5. As another example, the first memory region R1 may be provided by a part of a different memory, such as the RAM 4 or the SRAM 8. In the foregoing embodiment, the CPU 2 determines the occurrence of the abnormality at S101. As another example, a different ECU may determine an abnormality occurrence in the vehicle, and transmit information indicating the abnormality occurrence in the vehicle to the above-described ECU 1.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A vehicular electronic control apparatus comprising:
  a non-volatile memory being capable of storing a permanent diagnostic trouble code of a vehicle;
  a storing portion storing a real-time destination value indicating a currently set destination of the vehicle; and
  a determination unit determining, based on the real-time destination value stored in the storing portion, whether the permanent diagnostic trouble code is a target permanent diagnostic trouble code to be stored in the non-volatile memory.

2. The vehicular electronic control apparatus according to claim 1, wherein
  the determination unit includes a storing control section,
  when the determination unit determines that the real-time destination value stored in the storing portion is equal to a default value that indicates a manufacturing plant of the vehicle, the determination unit determines that the permanent diagnostic trouble code is not the target permanent diagnostic trouble code to be stored in the non-volatile memory, and
  when the determination unit determines that the permanent diagnostic trouble code is not the target permanent diagnostic trouble code, the storing control section forbids the non-volatile memory from storing the permanent diagnostic trouble code.

3. The vehicular electronic control apparatus according to claim 1, wherein
  the storing portion storing the real-time destination value is defined as a first storing portion,
  the non-volatile memory includes a second storing portion storing the permanent diagnostic trouble code when the permanent diagnostic trouble code is determined as the target permanent diagnostic trouble code to be stored in the non-volatile memory, the second storing portion further acquires the real-time destination value from the first storing portion at a storing time of the permanent diagnostic trouble code, and stores the real-time destination value, as a history destination value, correlated with the permanent diagnostic trouble code, the determination unit includes an output control section, when the determination unit determines that the history destination value stored in the second storing portion is not equal to a new real-time destination value stored in the first storing portion, the determination unit determines that the permanent diagnostic trouble code corresponding to the history destination value is not the target permanent diagnostic trouble code, and when the determination unit determines that the permanent diagnostic trouble code corresponding to the history destination value is not the target permanent diagnostic trouble code, the output control section forbids an output of the permanent diagnostic trouble code corresponding to the history destination value.

4. The vehicular electronic control apparatus according to claim 3, further comprising an overwriting section overwriting the history destination value and the permanent diagnostic trouble code corresponding to the history destination value with a new destination value and a corresponding permanent diagnostic trouble code when the history destination value is not equal to the new real-time destination value.

* * * * *